United States Patent [19]
Mortier

[11] Patent Number: 4,846,613
[45] Date of Patent: Jul. 11, 1989

[54] NUT WITH CORNER PASSAGES

[75] Inventor: Guy Mortier, Bonnetable, France

[73] Assignee: Souriau et Cie, Boulogne Billancourt, France

[21] Appl. No.: 203,938

[22] Filed: Jun. 8, 1988

[30] Foreign Application Priority Data

Feb. 19, 1988 [FR] France .................. 88 02001

[51] Int. Cl.⁴ .................. F16B 39/04; F16B 23/00
[52] U.S. Cl. .................. 411/87; 411/403; 411/405
[58] Field of Search .......... 411/87, 187, 188, 403–405, 411/410, 910, 911, 6, 107, 101; 403/316, 320

[56] References Cited

U.S. PATENT DOCUMENTS

| | | | |
|---|---|---|---|
| 573,800 | 12/1896 | Swanson | 411/87 |
| 1,336,077 | 4/1920 | Hales | 411/87 |
| 3,050,097 | 8/1962 | Cochran | 411/107 |
| 3,156,281 | 11/1964 | Demi | 411/107 |

FOREIGN PATENT DOCUMENTS 1287779 9/1972 United Kingdom .................. 411/6

Primary Examiner—Neill R. Wilson
Attorney, Agent, or Firm—Larson and Taylor

[57] ABSTRACT

The nut has two major faces and six lateral sides. A passage connecting two successive sides is formed in at least one, typically three corners. The passage is formed by a blind groove formed in one of the major faces of the nut, opening into a first one of the two successive sides and directed toward the other of the two successive sides and by a blind groove formed in the other of the major faces of the nuts, opening into the other one of the two successive sides and directed toward the one of the two successive sides, the grooves being of such length and direction that they have axially confronting portions and having sufficient depths for the confronting portions to interfere.

7 Claims, 2 Drawing Sheets

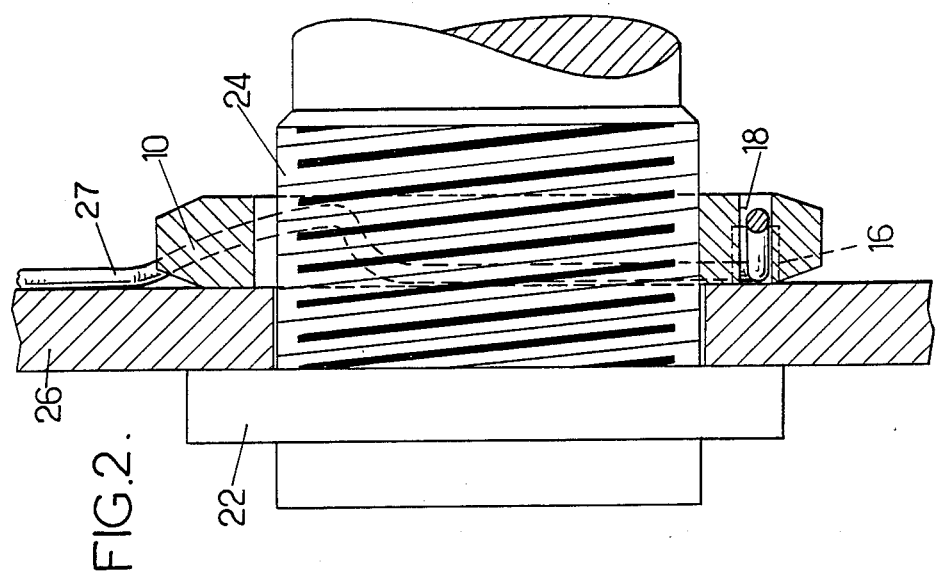
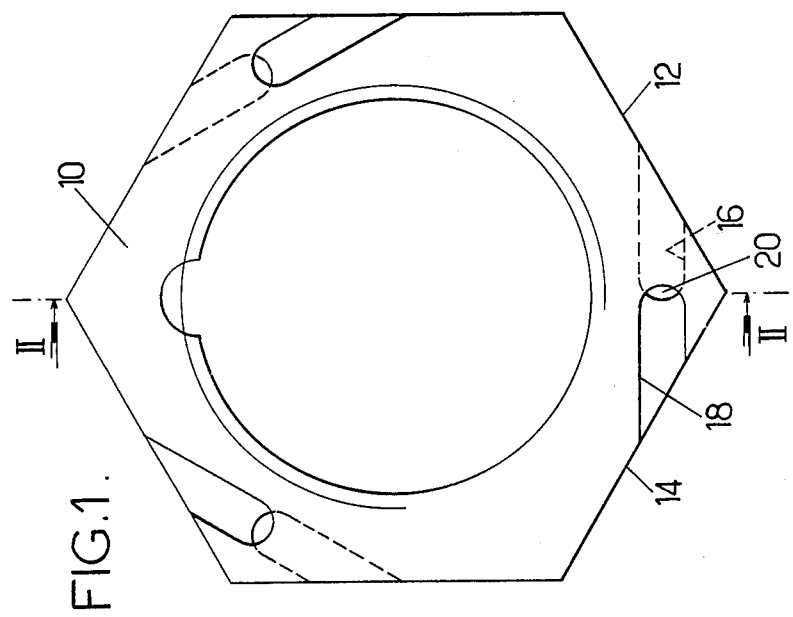

NUT WITH CORNER PASSAGES

BACKGROUND OF THE INVENTION

1. Technical Field

The invention relates to nuts of polygonal shape suitable for securing a socket having a base plate and a threaded part to a wall through which the threaded part projects ; it relates more particularly to such nuts having passage formed through some at least of the corners and emerging laterally at distance along the sides for receiving a locking wire preventing unscrewing of the nut.

The invention is particularly suitable for fixing a socket forming one of the halves of an electric or optical connector to a partition wall or casing. An arrangement which avoids tampering or prevents unscrewing due to vibration consists of engaging a length of wire through passages formed in several corners and securing its ends, for example in a washer locked against rotation against the wall or against a screw fixed to the wall.

2. Prior Art

Numerous nuts of the above type are already known. Machined nuts, generally of hexagonal shape, have been produced whose three corners are drilled for forming holes parallel to the planes of the larger faces. This solution is expensive. Attempts to obtain blanks having lateral shoulders making it possible to form the holes with drills attaching the wall perpendicularly have led to products not complying with the very strict aeronautical standards of some countries.

SUMMARY OF THE INVENTION

It is an object of the invention to provide an improved nut of the above defined type which is of low cost but nevertheless complies with the aeronautical standards.

To this end, there is provided a nut of polygonal shape in which each corner formed with a passage has, on one major face, a blind groove opening into a first side and directed towards the adjacent side and, on the other major face, a blind groove opening on to said other side and directed towards the first side. The sum of the depths of the grooves is greater than the thickness of the nut so that axially confronting parts of the grooves interfere and form one passage.

Each channel formed by a couple of grooves makes it possible to thread a wire through it without contact with the wall when the nut is tightened. In a typical embodiment, the grooves are mutually symmetrical. They may be directed perpendicularly to the bisector of the angle between the two sides. Often a groove depth equal to about two thirds of the thickness of the nut will give good results. Depending on the anticipated use of the nut, the degree of overlap of the grooves will be selected greater or lesser and in particular a passage may be formed of a width locally smaller than that of the grooves.

An important application of the invention is in the nature of locking nuts protected against tampering or untightening by a wire engaged in the passages and in an element fixed with respect to the wall, such as a washer clamped between the nut and the wall and positively locked against rotation.

The nut may be manufactured using different methods. It may be machined from a bar having a crosssection identical to that of the nut to be formed. A hole is bored along the bar. If an internal notch or groove is to be provided, it is broached. The bar is internally threaded then cut into lengths. Each nut blank thus formed is fed into a digitally controlled machine tool. The grooves to be formed on one major face are cut out, for example with a milling cutter. The blank is turned over and the other grooves are formed. The nut may then be directly used.

The invention will be better understood from the following description of a particular embodiment given by way of example. The description refers to the accompanying drawings.

BRIEF DESCRIPTION OF THE DRAWINGS

FIG. 1 is a front view of a hexagonal nut in accordance with the invention;

FIG. 2 is a view of the nut shown in FIG. 1, in cross-section through line II—II, connected to a socket;

DETAILED DESCRIPTION OF A PARTICULAR EMBODIMENT

Figure 3:
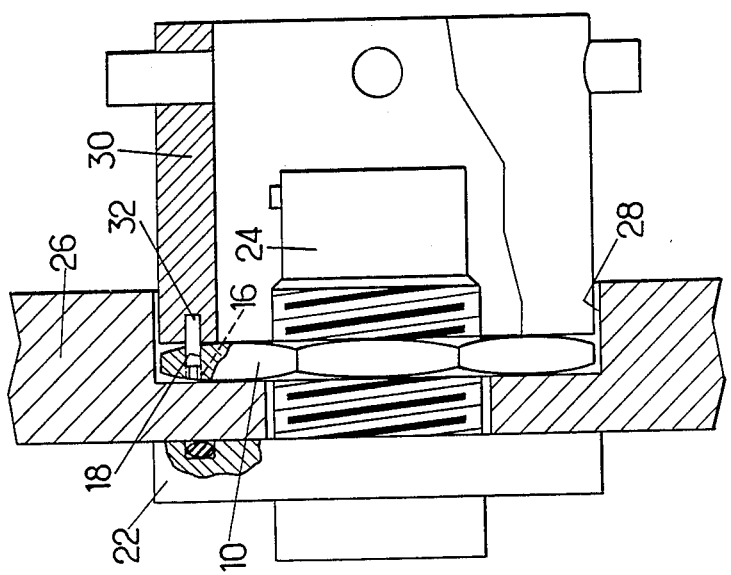
FIG. 3, similar to FIG. 2, shows another use of the nut of FIG. 1.

Referring to FIGS. 1 and 2, a hexagonal nut 10 is in the form of a flat metal part having two parallel major faces and six flat lateral sides and is formed with a threaded hole. A notch is formed along the threaded hole, intended to be screwed on to an externally threaded part of corresponding diameter. As shown in FIGS. 1 and 2, one corner out of two of nut 10 has a through passage which opens into two mutually adjacent sides, for example 12 and 14. Each passage results from the juxtaposition of two blind grooves, for example 16 and 18, each formed in one of the two major faces and having axially aligned end portions. Each groove opens into a lateral side. As illustrated in FIGS. 1 and 2, each groove has a depth approximately equal to ⅔ of the thickness of nut 10 and extends perpendicularly to the bisector of the respective angle. The grooves extend slightly beyond the bisector so that they have confronting portions which form a passage 20.

As shown in FIG. 2, the nut can be used for fixing a socket to a wall 26. The socket has a base 22 and a threaded extension 24 projecting across an opening in the wall 26. A wire 27 may be threaded into the three passages and under holding means securely fixed to the nut for locking the nut.

Nut 10 is simple to manufacture: an axial bore machined in a hexagonal bar. A groove is broached if required. The bar is internally threaded then cut into blanks having the thickness of the nuts to be formed. Each blank is fed to a digitally controlled machine tool where the three grooves on one major face are cut out, for example with a milling cutter. The blank is turned over and three other grooves are formed so as to form the passages 20. Such a manufacturing method is more economical than those of the prior art for maintaining nuts having the required passages and complying with aeronautical standards.

The presence of the grooves also makes it possible to tighten the nut even if it is located at the bottom of a recess of a diameter hardly greater than that of the circle circumscribing the nut. Referring to FIG. 3, in which the elements corresponding to those in FIGS. 1 and 2 are designated by the same reference numbers, a nut 10 for fixing a socket 22 is placed in a recess 28 of a wall 26. The presence of grooves 16 makes it possible to turn the nut with a tubular key with axially directed pins 32 of a diameter corresponding to the width of grooves 16 and 18. If the passage 20 due to overlapping of grooves 16 and 18 has a cross-section smaller than that of a circle having a diameter equal to the width of the grooves, pins 32 abut against the bottom of the grooves and, depending on the direction of the grooves, it is practically impossible to rotate the nut with the key in one direction or the other. A nut may thus for example be made which cannot be removed unless a special tool is used.

A passage 20 may also be used for inserting pins until it projects into a hole formed in the wall so as to lock the nut against rotation.

The nut will typically be made from metal, although in certain cases plastic materials reinforced with fibers may be used. The metal may in particular be one of those currently used for forming nuts for fixing electri connectors, such as AG5 aluminum alloy and stainless steel. By way of example, hexagonal nuts 3 mm thick have been formed from AG5 with a width between the major faces of from 10 to 46 mm. Each passage was formed by juxtaposing grooves machined with a milling cutter of 1.5 mm over a depth of 2.1 mm.

I claim:

1. Polygonal nut comprising two substantially parallel major faces and a plurality of lateral sides distributed regularly about an axis of said nut and forming regularly distributed corners, wherein a passage connecting two successive sides is formed in one at least of said corners, said pasasge being formed by a blind groove formed in one of the major faces of said nut, opening into a first one of said two successive sides and directed toward the other of said two successive sides and by a blind groove formed in the other of said major faces of said nuts, opening into said other one of said two successive sides and directed toward said one of said two successive sides, said grooves being of such length and direction that they overlap in both an axial direction and a direction normal to the axis.

2. Nut according to claim 1, wherein said grooves are mutually symmetrical.

3. Nut according to claim 2, wherein said grooves are directed perpendicularly to the bisector of the angle between the two sides.

4. Nut according to claim 1, wherein each of said grooves has a depth equal to about two thirds of the thickness of the nut.

5. Nut according to claim 1, wherein said grooves are of such lengths that they form a passage having a width locally smaller than that of the grooves.

6. Nut according to claim 1, wherein said grooves are formed by cutter milling.

7. In an assembly comprising:
a wall,
a socket having a base contacting the wall and a threaded portion projecting through the wall,
a polygonal nut having corners tightened on said threaded portion against said wall, and
a locking wire threaded into a plurality of passages each formed in a separate one of said corners,
said polygonal nut having two substantially parallel major faces and a plurality of lateral sides distributed regularly about an axis of said nut and forming regularly distributed corners, wherein each one of said passages each connecting two successive sides consists of a blind groove formed in one of the major faces of said nut, opening into a first one of said two successive sides and directed toward the other of said two successive sides and a blind groove formed in the other of said major faces of said nuts, opening into said other one of said two successive sides and directed toward said one of said two successive sides, said grooves being of such length and direction that they overlap in both an axial direction and a direction normal to the axis.

* * * * *